R. S. BROWN.
AUTOMOBILE SIGNALING DEVICE.
APPLICATION FILED OCT. 30, 1915.
1,245,864.
Patented Nov. 6, 1917.
5 SHEETS—SHEET 1.
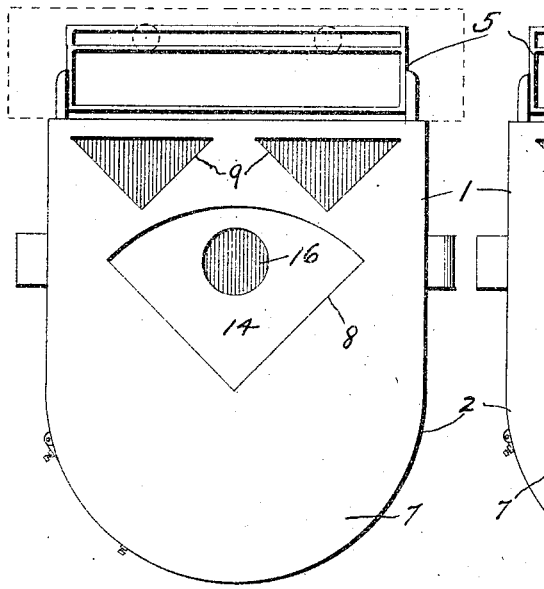
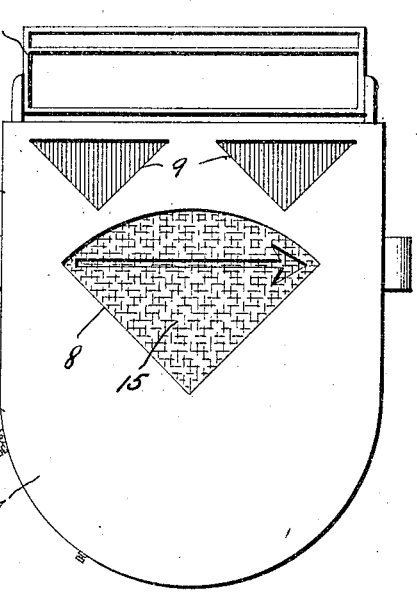
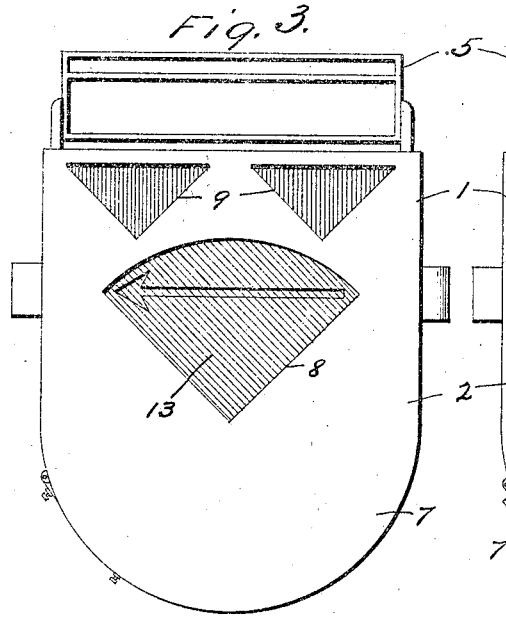
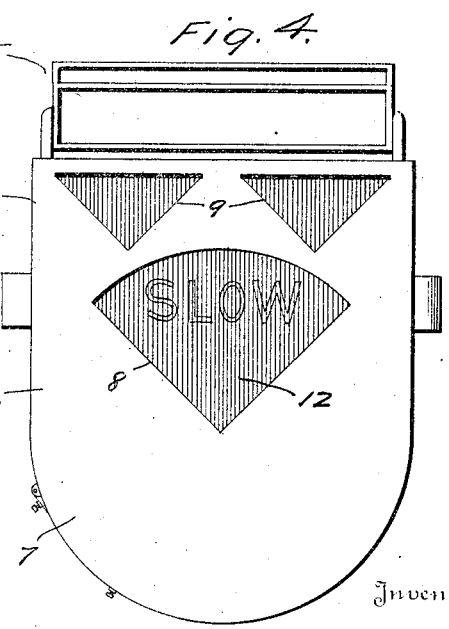

R. S. BROWN.
AUTOMOBILE SIGNALING DEVICE.
APPLICATION FILED OCT. 30, 1915.

1,245,864.

Patented Nov. 6, 1917.
5 SHEETS—SHEET 3.

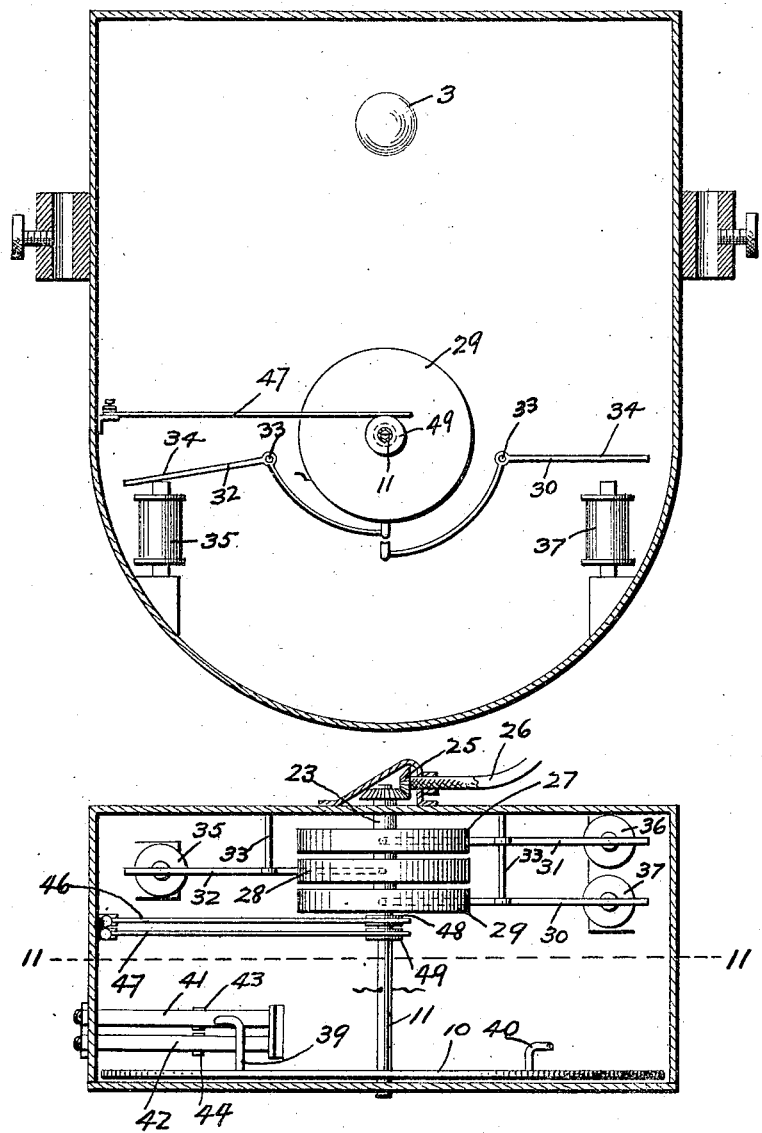

UNITED STATES PATENT OFFICE.

ROBERT S. BROWN, OF ASHEVILLE, NORTH CAROLINA.

AUTOMOBILE SIGNALING DEVICE.

1,245,864.  Specification of Letters Patent.  Patented Nov. 6, 1917.

Application filed October 30, 1915. Serial No. 58,823.

*To all whom it may concern:*

Be it known that I, ROBERT S. BROWN, a citizen of the United States, residing at Asheville, in the county of Buncombe and State of North Carolina, have invented certain new and useful Improvements in Automobile Signaling Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to automobile signaling devices and has for its object to provide a device in which a visible and an audible signal is simultaneously displayed and actuated for the purpose of indicating the direction of movement of the vehicle to which the signaling device is applied.

A further object of the invention is to provide a novel construction and arrangement of the parts for displaying a visible signal on a vehicle to indicate the direction of movement of the vehicle.

A further object of the invention is to provide a novel construction and arrangement of parts to indicate by an audible signal the direction of movement of a vehicle to which the signal is applied.

With these objects in view the invention consists in the novel construction and apparatus for displaying simultaneously a visible signal and for sounding an audible signal.

The invention further consists in certain novel construction for actuating and operating the visible and audible signals, and the invention further consists in certain novel details of construction and combinations of parts, all of which will be first fully described and afterward specifically pointed out in the appended claims.

Referring to the accompanying drawings—

Figure 1 is an elevation of a signal constructed in accordance with this invention, illustrating the position and character of the visible signal when the vehicle is at rest or moving in a straight line direction, at any speed other than one to which the legend "Slow" shown in Fig. 4 would be applicable.

Fig. 2 is a similar view, illustrating the position and character of the signal indicating that the vehicle is to be turned to the right.

Fig. 3 is a similar view, illustrating the position and character of the signal indicating that the vehicle is to be turned to the left.

Fig. 4 is a similar view, illustrating the position and character of the signal indicating that the vehicle is to be brought to a stop or to move forward at a slow rate of speed.

Fig. 11 is a vertical sectional view through the signaling apparatus, taken on line 11—11 of Fig. 12, and showing mechanism back of said line.

Fig. 12 is a horizontal sectional view taken through the signaling apparatus with the stationary and rotatable magnets removed.

Like numerals of reference indicate the same parts throughout the several figures, in which—

Figure 5:
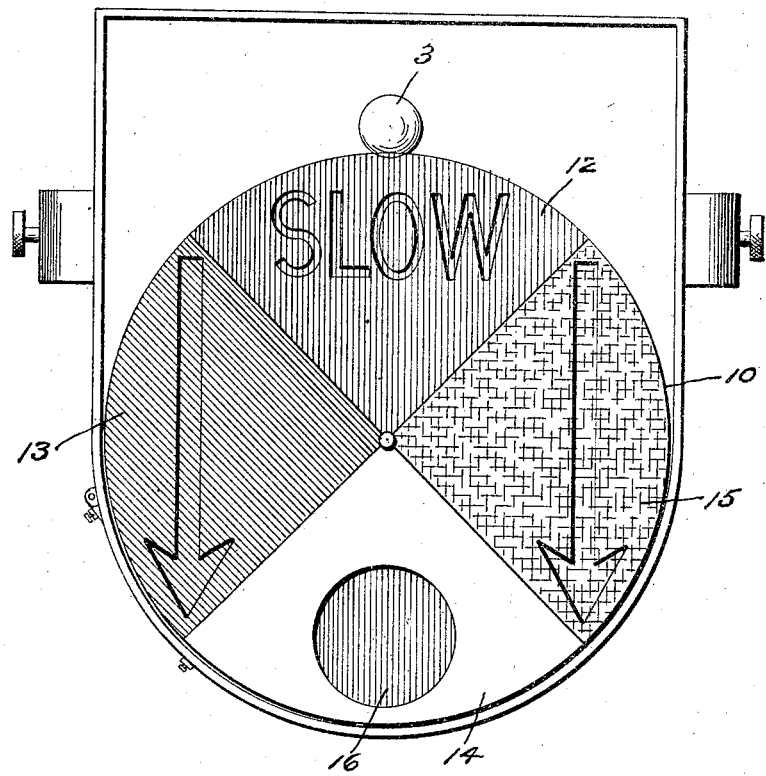
Fig. 5 is an elevation of the signal with its front removed, illustrating the rotatable signal disk and lamp.
Figure 6:
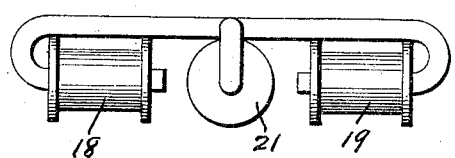
Fig. 6 is a side elevation of the stationary controlled magnets.
Figure 7:
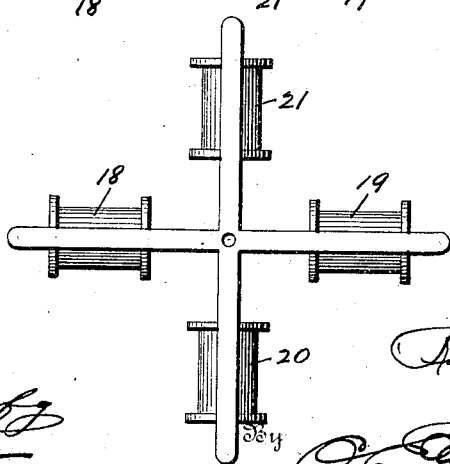
Fig. 7 is a rear elevation of the same.

1 indicates the signaling device which includes a suitable casing 2 having therein an electric lamp 3, a perforated top 4 and a bracket 5 thereon to support the usual license tag 6.

Obviously the casing 2 can be of the most convenient formation and of such capacity to accommodate the apparatus which will be hereinafter fully described.

For a more ready understanding of the construction, arrangement and operation of the device, the mechanical structure will first be described and the electric wiring subsequently described.

Referring now to Figs. 1, 2, 3 and 4 it will be seen that the front 7 of the casing is provided with a relatively large substantially triangular shaped opening 8, and above the same with preferably a pair of triangular shaped openings 9, said latter openings being closed with preferably a red glass, so that the rays from the lamp 3 will be clearly visible through the red glass in the said openings 9.

Referring now to Figs. 5 and 12 it will be seen that a large disk 10 is mounted within the casing on a hollow shaft 11, said disk 10 being preferably divided into four distinguished sections 12, 13, 14 and 15, the portions of the disk 10 in Fig. 5 within the outline of the arrows, circle and "Slow" being translucent, so that the rays from the lamp 3 will readily pass through the same, the balance of each sector being opaque and of the same color as indicating symbol, except the color of the sector surrounding red circle is to be same color as case (black). The color of the section 12 being red, the color of the section 13 being green, the color of the section 15 being yellow, while the color in the circular opening 16 in the section 14 is red, the balance of section 14 being of same color as outside of case (black). It will be understood that the said disk 10 is rotatable behind the front 7 of the casing, so that any one of the sections 12, 13, 14 and 15 may be brought directly behind the substantially triangular opening 8 in the casing, so that any one of the said sections can be displayed in said opening in the manner as shown in Figs. 1, 2, 3, and 4, the section 15 being preferably provided with an arrow pointing toward the right, while the section 13 is preferably provided with an arrow pointing toward the left to more particularly indicate the direction the vehicle is about to take, while the disk 10 is so constructed that the section 12 is heavier than the remaining sections so that the same will normally and automatically assume the position shown in Fig. 1 so as to normally display the section 14.

Figure 8:
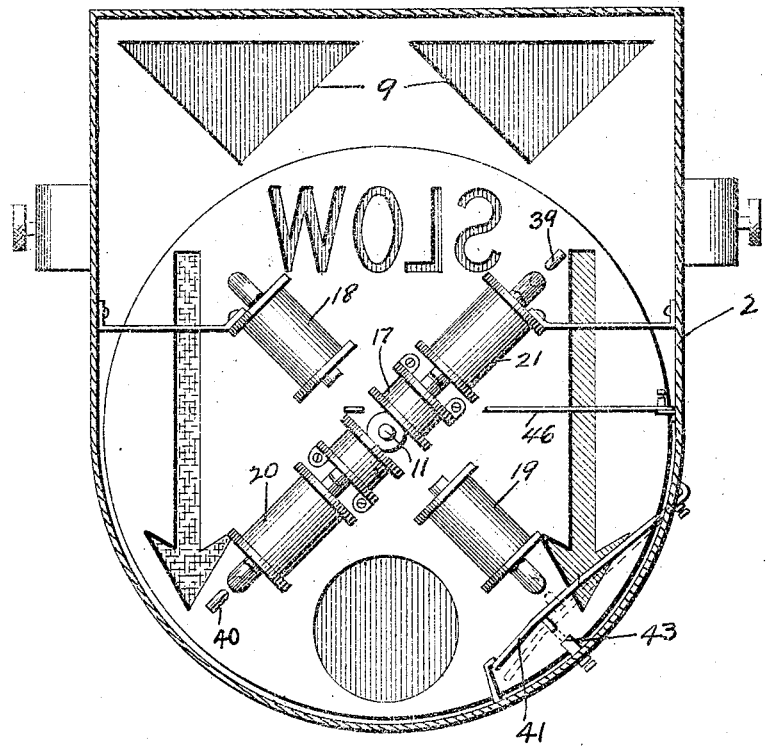
Fig. 8 is a vertical sectional view through the signaling apparatus, looking toward the front thereof.
Figures 13, 14:
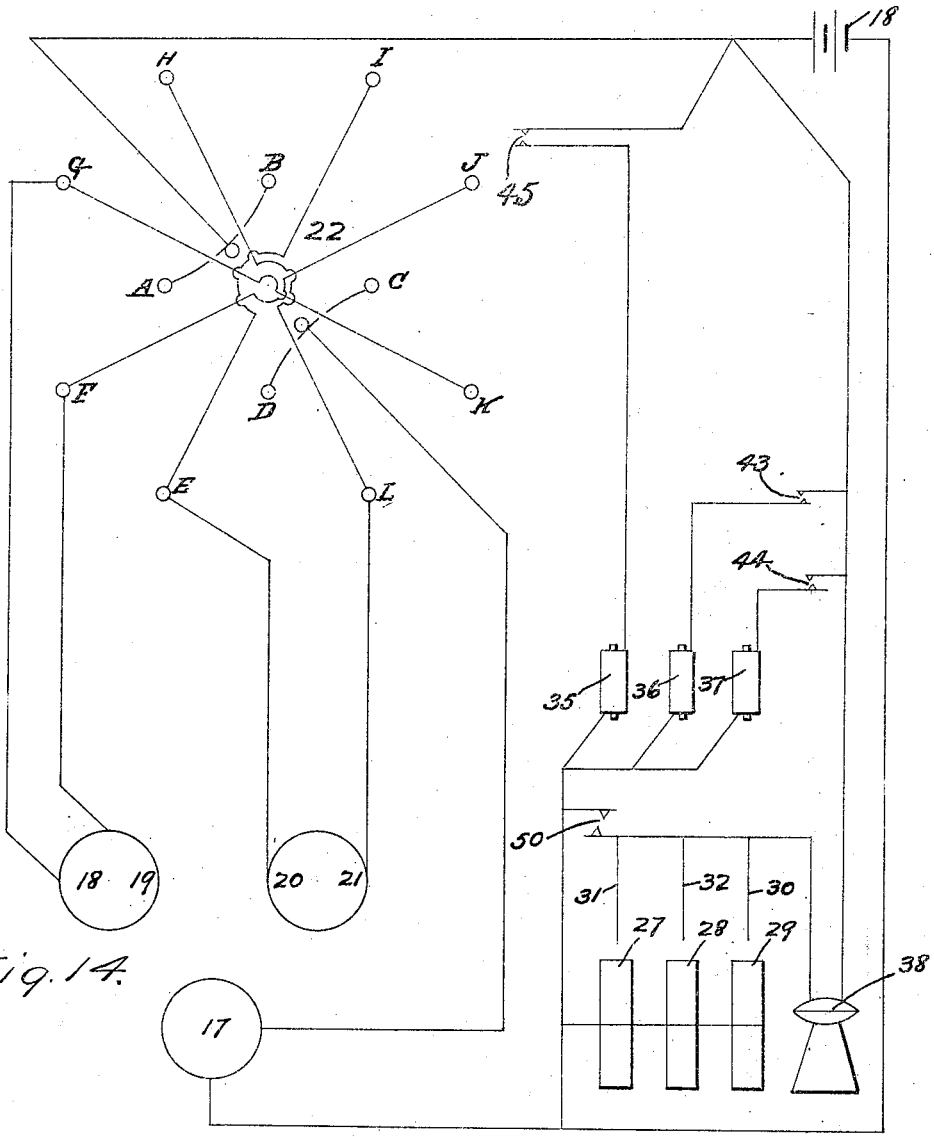
Fig. 13 is a top plan view of the casing, illustrating the perforations or openings therein through which light from the lamp passes to illuminate a number tag shown in dotted lines in Fig. 1.
Fig. 14 is a diagrammatic view, illustrating the electric wiring for the apparatus.

The rotatable disk 10 is under the control of the driver who by means of the electrical system to be hereinafter described can at will display in the substantially triangular opening 8 any one of the said disk sections. As before stated the rotatable signal disk 10 is mounted on a hollow shaft 11 on which shaft is mounted as shown in Fig. 8 a magnet 17 rotatable with the shaft 11 and wired as shown in Fig. 14, as will be hereinafter fully described, to which magnet current flows from the battery 18 or other source of current always in the same direction. Encompassing the magnet 17 and arranged stationary in the casing are the four magnets 18, 19, 20 and 21 which are wired in the manner as shown in Fig. 14 so that the direction of flow of the current to the said magnets 18, 19, 20 and 21 can be reversed at will, so as to reverse the poles of said last mentioned magnets in such manner that the central magnet 17 can be drawn and rotated so as to rotate its shaft 11 and the signal disk 10 to bring any one of the sections 12, 13, 14 and 15 behind the substantially triangular opening 8 in the casing, as will be readily understood. The direction of flow of current to the magnets 18, 19, 20 and 21 being controlled by the switch 22 diagrammatically illustrated in Fig. 14, which switch will form the subject of a separate application.

Figure 9:
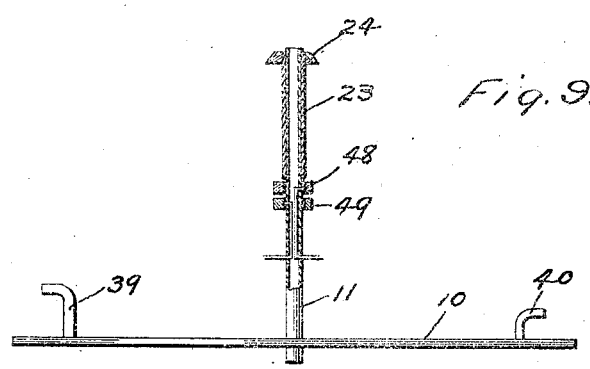
Fig. 9 is an edge elevation of the rotatable signal disk, illustrating its shaft and its component parts in section.

Referring now to Fig. 9 it will be seen that the hollow shaft 11 has applied thereto a sleeve 23 carrying a beveled pinion 24 which meshes with a pinion 25 (Fig. 12) driven from a rotating part of the vehicle as by means of a flexible shaft 26. Mounted on the sleeve 23 in the manner as shown in Fig. 12 are the three circuit closers or commutators 27, 28 and 29 which are rotated with the sleeve 23, so that upon movement of the vehicle said circuit closers or commutators 27, 28 and 29 are rotating simultaneously for a purpose which will be now described.

Figure 10:
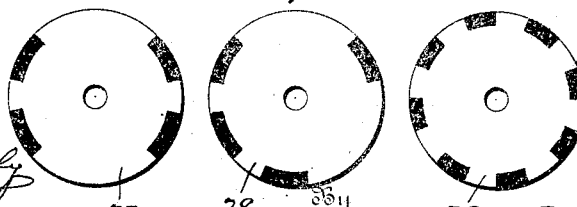
Fig. 10 is a diagrammatic elevation of the three circuit closing disks or commutators.

Referring now to Fig. 11 and also to Fig. 12 it will be seen that three brushes 30, 31 and 32 are conveniently pivoted within the casing as at 33 and are provided with arms 34 arranged in close association with the magnets 35, 36, and 37, said magnets 35, 36, and 37 being wired as diagrammatically shown in Fig. 14 so that upon energizing of one of said magnets the arm 34 of its adjacent brush will be drawn down in contact with the magnet to cause the contact end of the brush to be brought into electrical contact with the periphery of its circuit closer or commutator which may be any one of the circuit closers or commutators 27, 28 or 29 to intermittently close a circuit in which an electric horn 38 is disposed. As will appear from Fig. 10 the commutators 27, 28 and 29 are provided with insulated sections of varying arrangements, for instance the commutator 27 which is to indicate that the vehicle is to turn to the left has its insulated sections so disposed as to close the circuit for a relatively long period, followed by a break in the circuit and a relatively short period of closing, which causes the horn 38 to emit one long and one short blast successively, while the arrangement of the commutator 28 causes the horn 38 to emit two long and two short blasts successively which indicate a straight line forward movement of the vehicle, while the arrangement of the commutator 29 is such as to cause the horn 38 to emit a regular succession of short blasts to indicate that the direction of movement of the vehicle will be to the right. The closing of the circuits for energizing the magnets 36 and 37 is effected automatically upon rotatable movement of the signal disk 10 in the following manner.

Referring to Figs. 8 and 12 it will be seen that the signal disk 10 is provided on its rear face with two right-angled projections 39 and 40, the same being of different lengths, so that upon rotation of the signal disk 10 either the extension 39 will be brought into engagement with the leaf spring 41 or the shorter extension 40 will be brought into engagement with the leaf spring 42. The leaf spring 41 is in circuit with the magnet 36 while the leaf spring 42 is in circuit with the magnet 37, so that upon depression of either of said leaf springs 41 and 42 into position shown in dotted lines in Fig. 8 either one or the other of the electrical switches 43 or 44 are closed to energize either the magnet 36 or 37 to cause its adjacent brush to be brought into electrical contact with either of the commutators 27 or 29 so that the horn 38 will emit an audible signal indicating that the vehicle is to turn either to the right or to the left at the same time as, and simultaneously with the display of the vehicle signal appearing in the substantially triangular opening 8 of the casing 7.

For the effective sounding of the horn 38 to indicate a movement of the vehicle in a straight line a manually operated switch 45 is arranged conveniently to the driver which energizes the magnet 35 causing its brush to be brought into contact with the central commutator to emit successively two long and two short blasts of the horn, it being understood that the audible signal to indicate forward movement in a straight line is not sounded automatically, but is sounded at the will of the driver, while the energizing of the magnets 36 and 37 to sound the horn 38 is accomplished automatically by the movement of the signal disk 10 as heretofore described.

As the central magnet 17 is mounted on the hollow shaft 11 and rotates therewith I prefer to make the necessary electrical connections between this magnet and its circuit, by means of the brushes 46 and 47 acting on the rotating contact disks 48 and 49 and to pass the wires from the rotating disks 48 and 49 through the hollow shaft 11 and out therefrom to the magnet 17. By means of this construction all danger of twisting or breaking the wires passing to the central rotatable magnet 17 is avoided. From the foregoing description taken in connection with the accompanying drawings it will be understood that by means of the manually operable switch 22 the direction of flow of the current to the stationary magnets 18 and 19 and 20 and 21 can be reversed, so that the central magnet 17 can be caused to rotate into the desired position for the purpose of displaying any one of the disk sections 12, 13, 14 and 15, and on displaying the sections 13 or 15 a circuit is automatically closed by the movement of the signal disk 10 to energize one or the other of the magnets 36 or 37 to successively open or close the horn circuit to give a succession of blasts so as to indicate audibly the direction of movement the vehicle is about to take.

As heretofore stated the switch 22 is to be presented in a separate application and as the same is only illustrated diagrammatically in connection with the balance of the electrical system a brief description of the operation of the switch will be sufficient for a clear understanding of this present invention.

When the contacts B and D are moved to the right to connect B and J and D and K the current flows through the magnet 17 and through the magnets 18 and 19 energizing said magnets and causing the rotating signal disks 10 to be rotated so as to bring the section 15 into the substantially triangular opening 8, so as to display the visible signal indicating that the vehicle is to turn to the right. This movement of the rotating signal disk 10 causes one of its projections thereon to close one of the switches to energize the magnet 37 to attract the armature of the brush 30, so as to cause same to contact with the rotating commutator 29, thus intermittently breaking the horn circuit to cause a succession of short blasts to indicate by audible signal that the vehicle is to turn to the right.

When the contacts B and D are moved to the left to connect B and G and D and F the current flows in same direction as before through the central magnet 17, but the direction of flow is reversed through the magnets 18 and 19, thus reversing the polarity and causing the rotating signal disk 10 to be rotated so as to display section 13 thereof indicating by visible signal that the vehicle is to turn to the left. This movement of the signal disk 10 causes one of its projections thereon to close the opposite switch, thereby energizing magnet 36 to attract the armature of the brush 31 to cause said brush to contact with the rotating commutator 27 to intermittently break the horn circuit and cause said horn to emit successively one long and one short blast to indicate by audible signal that the vehicle is to turn to the left.

Upon movement of the contacts A and C upwardly so as to connect A and H with C and I current is caused to flow through the stationary magnet 17 always in the same direction to energize the same and to flow through the magnets 20 and 21 energizing the same and causing the signal disk 10 to be rotated to display the section 14, which it is understood will remain so displayed even after switch 22 is disconnected and current ceases to flow through the magnets until the switch 22 is moved to display another section of the signal disk 10 and to sound the audible signal.

Upon movement of the contacts A and C downwardly so as to connect A and E and C and L current is caused to flow through the stationary magnet 17 always in the same direction to energize the same, and to flow through the magnets 20 and 21, reversing their polarity and causing the signal disk 10 to be rotated to display the legend "Slow", which it is understood will remain so displayed until the switch 22 is moved to display another section of the signal disk 10 and to sound the audible signal.

For emergency a manually operable switch 50 is provided to close the horn circuit independently of the rotating commutators 27, 28 and 29 to produce a continuous and uninterrupted sounding of the horn.

Having thus fully described the invention its uses and operation will be entirely apparent from the foregoing description taken in connection with the accompanying drawings, and while it is apparent that the invention is susceptible of certain changes and alterations in the construction and arrangement of the parts, I consider myself clearly entitled to all such modifications as fall within the limit and scope of the appended claims.

What I claim as new and desire to secure by Letters Patent of the United States is—

1. A signaling device of the type described for vehicles, including an audible signal, a rotatable signal-element having suggestive indicia or legends thereon, a plurality of electric circuits, a switch for closing the same, a sleeved shaft carrying said signal-element and also a magnet, the sleeve of said shaft receiving motion from the vehicle, a plurality of commutators or circuit-breakers provided with brushes and carried by said sleeve, each being provided with a variable arrangement of insulation, a plurality of magnets, two of the commutator brushes being controlled from corresponding ones of said plurality of magnets, and means for electrically controlling the movement of said signal-element simultaneously with the actuation of the audible signal.

2. A signaling device of the type described for vehicles, including a rotatable signal-element having suggestive indicia or legends thereon, a plurality of electric circuits, means for closing the same, a sleeved shaft carrying said signal-element and also a magnet, the sleeve of said shaft receiving motion from the vehicle, a plurality of commutators or circuit-breakers provided with brushes and carried by said sleeve and each being provided with a variable arrangement of insulation, a plurality of magnets, two of said commutator-brushes being controlled from corresponding ones of said plurality of magnets, the other of said commutator-brushes being controlled from the remaining one of said magnets, and means for electrically controlling the movement of said signal-element, resilient members electrically connected to said magnets, said signal-element being provided with members projecting therefrom, and of different lengths for engagement with said resilient members, respectively.

In testimony whereof I affix my signature in presence of two witnesses.

ROBERT S. BROWN.

Witnesses:
 E. F. BROWN,
 LOUIS M. BROWN.